United States Patent Office 3,824,087
Patented July 16, 1974

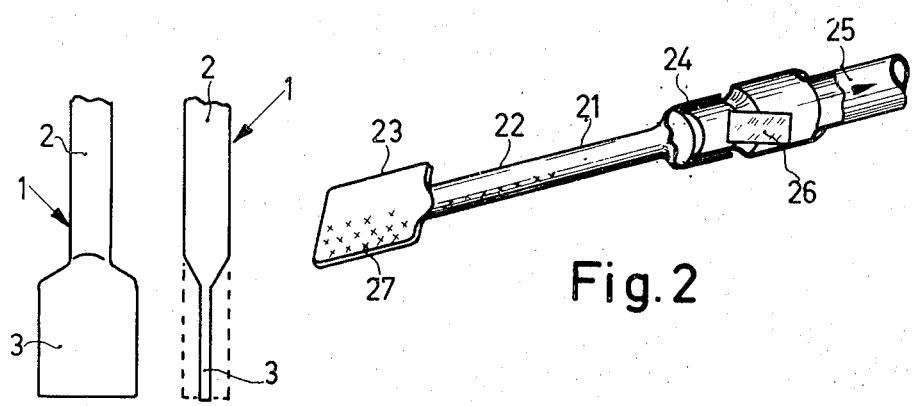
Fig. 1a  Fig. 1b
Fig. 2
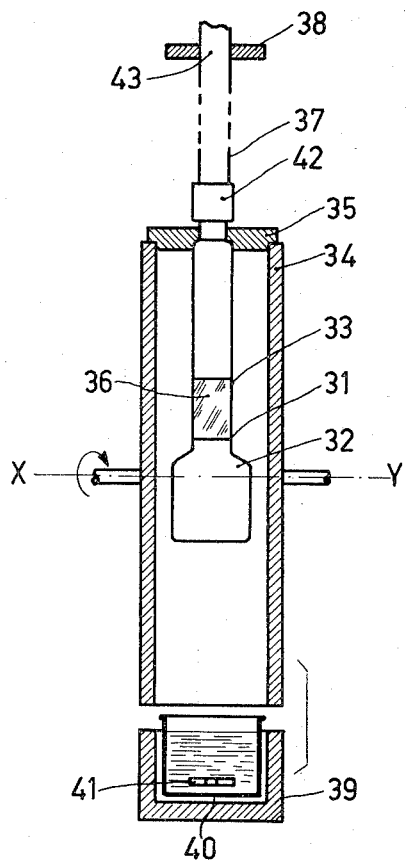
Fig. 3

3,824,087
METHOD OF MANUFACTURING A SOLID
SEMICONDUCTOR GLASS
Jean Cornet, Limeil-Brevannes, and Dominique Rossier, Paris, France, assignors to U.S. Philips Corporation, New York, N.Y.
Filed Oct. 18, 1972, Ser. No. 298,623
Claims priority, application Netherlands, Oct. 29, 1971, 7138913
Int. Cl. C03b 29/00, 27/00, 5/16
U.S. Cl. 65—32
4 Claims

ABSTRACT OF THE DISCLOSURE

A method of manufacturing binary chalcogenide glass types from arsenic and tellurium in atomic ratios of from 30 to 60% of arsenic. According to this method a tempering treatment in stages is performed in a bath containing molten salt.

---

The present invention relates to a method of manufacturing binary chalcogenide glass types of arsenic and tellurium in atomic ratios of from 30 to 60% of arsenic, a device for performing the method and plates or rods of binary chalcogenide glass obtained by using the method.

Given chalcogenide compounds exist at a normal temperature in a vitreous state which is stable with time. "Chalcogen" elements are to be understood to mean the elements of the oxygen group, such as sulphur, selenium and tellurium.

Glasses used to be manufactured based on sulphur and selenium which elements have a strong tendency to form glass. On the other hand the manufacture of binary glass based on tellurium presents many difficulties.

In the article entitled: "Formation and Dielectric Properties of Glass in the System As-Te" published in "The Journal of Applied Physics," vol. 4, No. 2 of February 1965 by S. Tsugane and M. Haradome, the authors study the samples manufactured by means of a tempering process.

The applicant has experienced that the quality of the samples obtained is dependent to a large extent on the circumstances under which tempering is performed.

The present invention has for its object to define circumstances which make it possible to obtain materials having satisfactory mechanical properties.

It relates to a method of manufacturing binary chalcogenide glasses consisting of arsenic and tellurium in atomic ratios of from 30 to 60% of arsenic and is characterized in that the method comprises a tempering treatment for homogenizing in a molten state in a furnace at an elevated temperature, followed by a tempering treatment in stages performed in a bath containing molten salt.

"Tempering in stages" is a tempering method which consists of a sudden heating at a temperature which lies between the temperature at which there is no reaction and the temperature at which the reaction speed is at a maximum. The material is maintained at these intermediate temperatures until the desired structure is obtained.

According to the present invention the melt from which the binary chalcogenide glass is to be formed is suddenly brought from the temperature which is required for homogenisation to a temperature which lies between the softening point of the glass and the crystallisation temperature in order to remove the stresses due to the tempering process without modifying the vitreous structure; the melt is maintained at this temperature for a given period and subsequently it is cooled down to room temperature.

The tempering process for homogenisation in the liquid phase is preferably performed in a rotatable furnace. A first advantage of the present invention is that it makes it possible to obtain glasses in a very reproducible manner.

Further advantages of the method according to the invention are that glasses having an eminent homogeneity and an eminent mechanical behaviour are obtained.

The present invention makes it possible to obtain binary glasses from arsenic and tellurium in atomic ratios such that the concentration of arsenic lies between 30 and 60%. Of course the composition with 40% of arsenic being not a glass, but a defined compound, is not within the scope of this invention.

The experiments performed by the applicant have shown that a tempering process in air, for example, for the compound $As_{50}Te_{50}$ yields comparatively slightly brittle solid glass which, when being examined under the electron microscope, exhibits inhomogeneous fragments: the material is not completely vitreous. This may lead to the conclusion that the tempering process in air is not sufficiently rapid. For a tempering process in water which is effected at a much faster rate because it is performed by dropping the tube containing the mixture of arsenic and tellurium into water a glass is obtained which does not exhibit any homogeneity faults but which is not usable insofar as its mechanical properties are concerned. This material obtained by the tempering process in water is a completely cracked material under stress.

On the other hand a method according to the invention provides glasses which are homogeneous throughout as regards their structure and chemical composition, that is to say, they have a constant composition at any point at an accuracy tolerance of 2%. These glasses do not show any trace of crystallisation and have an eminent mechanical behaviour; they may be manufactured in different shapes.

The present invention also relates to a device for carrying out the method and is characterized in that it consists of an ampoule formed by a tube of molten quartz glass, which ampoule terminates in a parallelepiped-shaped capsule whose internal thickness is small. The thickness is preferably in the order of 2 mms. The diameter of the tube may likewise be of this order or may be larger.

During the tempering process the special shape of this ampoule, as compared with the known conventional cylindrical shape of the generally used ampoules exhibits, as a result of its large ratio between surface and volume: an optimum removal of heat, a uniform distribution of the temperature and hence a uniform tempering rate for the entire sample.

The invention will be further described with reference to the accompanying drawings.

FIG. 1a shows an ampoule in a front elevational view and FIG. 1b shows the said ampoule in a side view.

FIG. 2 shows a loaded ampoule connected to a vacuum pump.

FIG. 3 shows the said ampoule in a furnace.

An ampoule 1 (FIGS. 1a and 1b) which is made of molten quartz glass comprises a tube 2 and a parallelepiped-shaped capsule 3. This capsule is obtained by placing two quartz glass plates, with the interposition of silicon pieces, over each other. These pieces make it possible to adjust the interspace between the two plates at the desired value.

The following operations are carried out for the manufacture of the ampoule. A first plate of quartz glass of, for example, 1.5 mms. thickness is provided and subsequently two pieces of quartz glass of, for example, 1 or 2 mms. thickness are provided at the ends of these plates and a second plate of quartz glass which is equal to the first plate is placed on these pieces. The ends of the device are heated and thus a parellepiped-shaped capsule which is closed at one of the ends is formed by melting of the glass. The tube is secured to the capsule by means of heating.

In the case shown the diameter of the tube is larger than the thickness of the parallelepiped-shaped capsule.

In one embodiment the following internal dimensions were used: a height of 40 mms., a width of 16 mms. and a thickness of 2 mms. for the parallelepiped-shaped part, a diameter of 9 mms. for the cylindrical tube projecting above the parallelepiped.

In FIG. 2 the ampoule 21 is shown with the cylindrical part 22 and the parallelepiped-shaped capsule 23 in a substantially horizontal position for degassing. The ampoule is connected by means of part 24 to a vacuum pump 25; a quartz glass plug 26 is shown which serves for sealing off the ampoule. The arsenic and tellurium grains 27 are present in the ampoule.

FIG. 3 shows an ampoule 31 with the parallelepiped-shaped capsule 32 and the cylindrical tube 33, which is placed in a furnace 34, and a securing bracket 35. The ampoule 31 is closed by the quartz glass plug 36. A metal rod 37 and a stop 38 are also shown.

The furnace is preferably rotatable and in this case it can rotate 180° about an XY axis which is shown in a chain-link line in the drawing. A tempering vessel 39 and a hard glass vessel 40 containing the tempering bath and a magnetic stirrer 41 are shown at the lower end.

According to the invention the manufacture of binary chalcogenide glasses starting from arsenic and tellurium is performed as follows:

A ampoule of molten quartz glass is used which terminates in a parrallelepiped-shaped capsule according to FIGS. 1a and 1b. This ampoule is cleaned with acid in known manner, subsequently it is evacuated at a temperature of more than 800° C. Arsenic, for example, having a purity of 99.999% is then introduced into this ampoule in unground pieces in order to limit oxidation and 5N tellurium, for example, having a purity of 99.999% in the desired ratios.

In the horizontal position shown in FIG. 2 the ampoule is subsequently evacuated for several hours up to a pressure of 2 to $3.10^{-6}$ Torr while the arsenic and tellurium grains are located alongside the ampoule in such a manner that they make an efficient degassing possible.

The ampoule is subsequently placed in a vertical position according to FIG. 3 in such a manner that the quartz glass cylinder 36 whose height is approximately 60 mms. and whose diameter is slightly smaller than the internal diameter of the cylindrical tube 33 starts to slide off the ampoule 31. The ampoule is then sealed by sealing the upper part of the quartz glass plug 36 to the walls of the tube 33 while maintaining the capsule in liquid nitrogen so as to avoid sublimation of the products. The position of the plug and filling of the capsule are such that the free volume above the material after melting is as small as possible.

The ampoule is then placed in a vertical, preferably rotatable furnace 34 whose temperature is brought to approximately 800° C. This temperature is maintained for at least 48 hours. The furnace 34 is tilted 180° about the XY axis every 12 hours. This movement makes it possible to prevent the formation of cavities within the sample by promoting the unification of microgas bubbles.

After 48 hours of tempering in order to render the ampoule homogeneous it is dropped into the tempering bath which is placed in the vessel 39 on the bottom of the furnace. In order to avoid breakage of the ampoule on the bottom of the tempering vessel the following procedure is used. A metal rod 37 is fixed by means of a flexible connection to the end 42 of the ampoule 31 while the end 43 of the metal rod 37 abuts a stop 38. When the ampoule 31 is dropped the end 43 of the metal rod 37 encounters the stop 38 which abuts this rod 37: the ampoule is slowed down and does not bump against the lower side of the tempering vessel whereby breakage is prevented.

This tempering vessel contains a molten salt such as for example salt 275 which is supplied by Houghton and which has satisfactory wetting properties, a satisfactory thermal conductivity and does not cause heating or combustion upon the contact with the hot tube. This salt is placed in a hard glass vessel which is heated in an oil bath by means of a heating resistor. The molten salt is stirred in such a manner by a magnetic stirrer that a satisfactory removal of the heat by means of convection is achieved. The temperature of the bath $T_b$ lies between the softening point of the glass $T_g$ which temperature is determined by means of the dilatometer or by differential thermal analysis, and the threshold of the crystallisation range $T_r$ which temperature is determined by differential thermal analysis. As a result:

$$T_g < T_b < T_r$$

For the binary chalcogenide glasses consisting of arsenic and tellurium the temperature $T_b$ lies between 140 and 180° C. The period of the ampoule being maintained in the molten salt at this temperature is in the order of 1 hour.

Finally the ampoule in the bath is slowly cooled down to room temperature.

The binary chalcogenide glasses obtained by the method according to the invention are homogeneous throughout as regards their structure and chemical composition. This means that the composition corresponds, with a tolerance of 2%, to the envisaged composition. No trace of crystallisation can be determined by means of X-rays, by optical microscopy and under the electron microscope.

The glass has an eminent mechanical behaviour. Particularly it may be manufactured without cracks in the form of plates of 50 x 2 x 20 mm. or in the form of rods having a diameter of 8 mms. and a height of 40 mms.

The mechanical behaviour is such that the material can be polished or ground to a thickness of less than 50 micrometres.

The glass is manufactured in a reproducible manner as regards the most important physical properties, particularly the softening point $T_g$. For example, for the compound $As_{50}Te_{50}$ the softening point $T_g$ is approximately 140° C. For the same compound $As_{50}Te_{50}$ a transition in the infrared range of more than 50% is observed in the interspace at a wavelength of 2 to 20 micrometres, while absorption bands are completely absent.

What is claimed is:

1. In a method of manufacturing binary chalcogenide glasses consisting of arsenic and tellurium in atomic ratios of from 30 to 60% of arsenic in which method arsenic and tellurium are introduced into an ampoule of molten quartz glass, said method comprising the steps of: tempering said ampoule containing arsenic and tellurium for homogenization in a molten state in a rotable furnace at an elevated temperature, and subsequent tempering said ampoule in stages performed in a bath containing molten salt.

2. A method of manufacturing binary chalcogenide glasse as claimed in Claim 1, wherein the step of tempering for homogenization in a molten state in the furnace is performed at a temperature of between 600 and 820° C. for at least 48 hours.

3. A method of manufacturing binary chalcogenide glasses as claimed in Claim 1, wherein the step of tempering in stages is performed in three stages, a fast stage in a bath maintained at a temperature which lies between the softening point of the glass and the threshold of the crystallization range, a second stage for approximately 1 hour at the said temperature and a third stage during which the bath is slowly cooled down to room temperature.

4. A method of manufacturing binary chalcogenide glasses consisting of arsenic and tellurium, said method comprising the steps of:

supplying an evacuated ampoule of molten quartz glass;
introducing arsenic and tellurium into said ampoule in atomic ratios of from 30 to 60% of arsenic;
degassing the ingredients of said ampoule at a reduced pressure;
sealing the upper portion of said ampoule while maintaining the lower portion in liquid nitrogen;
tempering and homogenizing the ingredients of said ampoule by placing said ampoule in a rotable furnace having a temperature of approximately between 600 and 820° C. for at least 48 hours, tilting the furnace 180° every 12 hours;
rapidly lowering the ampoule following homogenization into a molten salt bath, said bath being maintained at a temperature lying between the softening point of the glass and the threshold of the range of crystallization;
maintaining the ampoule in the salt bath at said temperature for approximately 1 hour;
and slowly cooling the bath down to room temperature.

References Cited

UNITED STATES PATENTS

| | | | |
|---|---|---|---|
| 3,154,424 | 10/1964 | Bailey et al. | 65—32 X |
| 3,343,972 | 9/1967 | Hilton, Jr., et. al. | 65—32 X |
| 2,146,224 | 2/1939 | Phillips | 65—116 |
| 3,293,016 | 12/1966 | Cornelissen | 65—116 X |
| 3,451,797 | 6/1969 | Meth | 65—116 |
| 3,222,142 | 12/1965 | Shell et al. | 65—32 X |
| 3,451,794 | 6/1969 | Patterson | 65—32 X |

FRANK W. MIGA, Primary Examiner

U.S. Cl. X.R.

65—134, 116; 106—47 R